United States Patent [19]

McCarthy

[11] Patent Number: 5,373,548
[45] Date of Patent: Dec. 13, 1994

[54] OUT-OF-RANGE WARNING SYSTEM FOR CORDLESS TELEPHONE

[75] Inventor: Dennis R. McCarthy, Syracuse, N.Y.

[73] Assignee: Thomson Consumer Electronics, Inc., Indianapolis, Ind.

[21] Appl. No.: 225,368

[22] Filed: Apr. 8, 1994

Related U.S. Application Data

[63] Continuation of Ser. No. 637,018, Jan. 4, 1991, abandoned.

[51] Int. Cl.⁵ .................... H04M 11/00; H04Q 7/00; H04B 17/00
[52] U.S. Cl. ........................ 379/63; 379/58; 379/61; 379/62; 455/33.1; 455/33.2; 455/34.1; 455/67.1
[58] Field of Search ............... 370/95.1; 379/56, 58, 379/61, 62, 63, 88, 356, 355; 455/33.1, 33.2, 34.1, 67

[56] References Cited

U.S. PATENT DOCUMENTS

| 4,032,723 | 5/1992 | Mendoza | 379/61 |
| 4,853,951 | 8/1989 | Bauer | 379/62 |
| 4,930,149 | 5/1990 | Matsushima | 379/61 |
| 4,953,197 | 8/1990 | Kaewell, Jr. et al. | 379/58 |
| 4,974,251 | 11/1990 | Ohta et al. | 379/61 |
| 4,996,715 | 2/1991 | Marui et al. | 455/33 |
| 5,086,507 | 2/1992 | Mela | 455/34 |
| 5,134,708 | 7/1992 | Marui et al. | 455/33.2 |

FOREIGN PATENT DOCUMENTS

| 0317050 | 12/1989 | Japan | 379/61 |
| 2178270 | 2/1987 | United Kingdom | 455/67 |

OTHER PUBLICATIONS

Markline, "A Cordless Phone Designed For Superior Reception" WC560, Dec. 1985.
Panasonic, "Operating Instructions: Cordless Phone Model #KX-T3000" Sep. 23, 1988.

*Primary Examiner*—Curtis Kuntz
*Assistant Examiner*—William Cumming
*Attorney, Agent, or Firm*—Joseph S. Tripoli; Peter M. Emanuel; Frederick A. Wein

[57] ABSTRACT

The present invention relates to a cordless telephone unit having a handset and a base unit. The signal strength of a handset which is received by the base unit is examined to determine whether or not the handset is beyond a predetermined range from the base unit. If such determination of out-of-range is made, a warning signal is transmitted from the base unit to the handset and if the handset is not brought within range within a predetermined number of warning signals, a hang up is initiated wherein the handset is placed in an "on" hook condition and the captured telephone line is released.

3 Claims, 3 Drawing Sheets

OUT-OF-RANGE WARNING SYSTEM FOR CORDLESS TELEPHONE

This is a continuation of application Ser. No. 637,018, filed on Jan. 4, 1991, now abandoned.

BACKGROUND

The present invention relates to cordless telephones, and in particular, to an out-of-range warning system for said cordless telephones wherein the strength of the carrier signal received by the base station from the handset is monitored to determine whether or not the handset is within operational range. According to aspects of the present invention, if it is determined that the handset is out-of-range, a plurality of warning signals at the determined intervals is transmitted from the base station to the handset as a warning of impending system inoperability. After a predetermined number of warnings, the telephone unit is switched "on" hook and disconnected from the telephone network.

One method previously used was for the handset to generate a guard tone at a frequency above or below that of the transmitted speech, e.g., 40 Hz or 6 KHz, and transmitted from the handset to the base unit station within the audio band used for voice. A sensing system within the base station would periodically test for presence of such a guard tone and if it was determined that the guard tone was no longer present, the assumption was made that the handset was out of operational range from the base station, and the telephone unit would be abruptly disconnected from the telephone network by an "on" hook command. Such an abrupt and unwarned of disconnect can be very unnerving to a user particularly if a telephone conversation is of great importance. Another approach taken in the prior art is to sense the carrier level received by the base station and if such carrier level received from the handset is below a predetermined threshold level, there is a hang up of the line without any warning. Still another approach taken in the prior art is to provide a warning, such as a double beep, if the carrier level received by the base station from the handset is below a predetermined threshold level. However, in such a case, once the warning is issued, there would be no disconnect, so that the user, either not being within operational range of the base station or perhaps with a battery operating the handset which did not retain sufficient charge to operate the handset, would continue using the non-operable handset with the result that the line would be tied up for an indefinite time while the telephone unit was in a non-operational mode.

The present invention overcomes these undesirable operational conditions. According to aspects of the present invention the base unit measures the RF signal level received from the handset and provides a warning tone at the earpiece of the portable handset if the RF signal level is below a minimum operating threshold level. This warning signal is provided such that even if the handset is beyond the normal operating range of the cordless telephone, the user can still hear the signal. The base unit will transmit the "out-of-range" signal a predetermined number of times and then, if the portable handset unit does not come back into the operating range of the base unit, the base will then disconnect from the telephone line.

SUMMARY OF THE INVENTION

The present invention relates to a cordless telephone unit having a handset and a base unit. The signal strength of a handset which is received by the base unit is examined to determine whether or not the handset is beyond a predetermined range from the base unit. If such determination of out-of-range is made, a warning signal is transmitted from the base unit to the handset and if the handset is not brought within range within a predetermined number of warning signals, a hang up is initiated wherein the handset is placed in an "on" hook condition and the captured telephone line is released.

DETAILED DESCRIPTION OF THE PREFERRED EMBODIMENT

Figure 1:
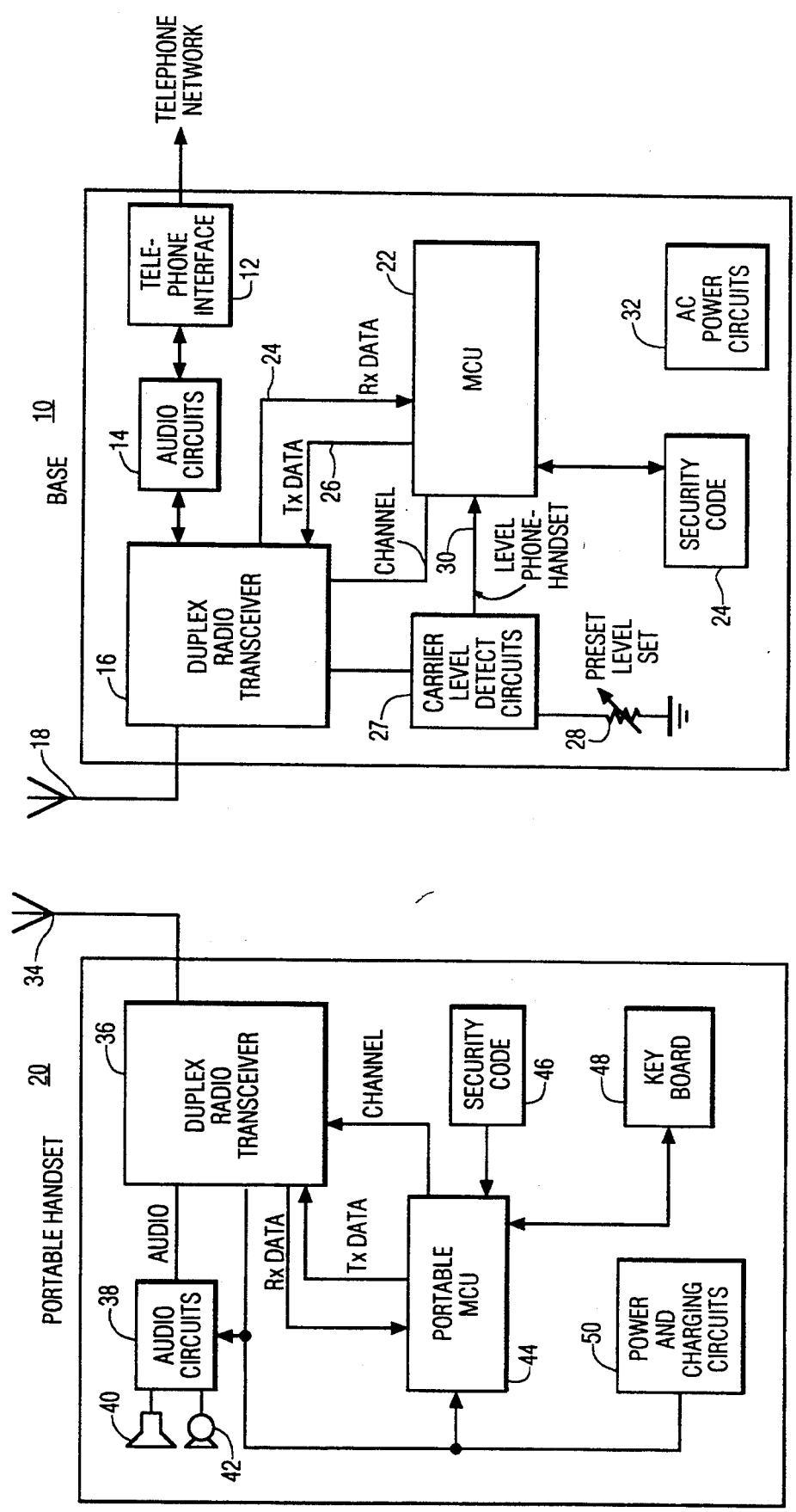
FIG. 1 is a block diagram representation of a cordless telephone unit having a portable handset and a base unit.

Reference can be had to the drawings whereas like members are designated with like numerals. FIG. 1 shows a cordless telephone arrangement. A cordless telephone includes a base unit 10 having a telephone interface 12 which interconnects with an externally provided telephone network. Telephone interface 12 provides a two-way (full duplex) coupling between the telephone network and audio circuits 14, which in turn provides two-way communication with full duplex radio transceiver 16 coupled to an antenna 18. Transceiver 16 transmits and receives duplex transmissions with handset 20 on a pair of channels within the frequency range of 46 MHz through 49 MHz with the carrier being FM modulated according to applicable FCC specifications. The operation of transceiver 16 is governed by microprocessor 22 through data receive line(s) 24, data transmit line(s) 26, and channel selection line 25. It is not uncommon for microprocessor 22 to be provided with a security code generator 24 so that it is determined that the received transmissions are received from the designated portable handset and not from a handset of another telephone unit. A determination is made by detection circuit 27 whether or not the carrier signal received by transceiver 16 from handset 20 is above a predetermined threshold level. The determination of the detected carrier level is coupled to microprocessor 22 at line 30. Base 10 is also provided with DC power voltages from power supply 32 which is coupled to a source of power such as a DC battery or an AC line.

Handset 20 is provided with an antenna 34 coupled to a duplex radio transceiver 36 which in turn is coupled to audio circuits 38 for providing the received signal in audio form to loudspeaker 40 and receiving input voice communications from microphone 42 for transmission to base 10. Transceiver 36 is controlled by a microprocessor 44 having a security code input from 46 and a keyboard entry port from keyboard 48 to enable dialing out as well as transmitting other commands such as redial or "on" hook/"off" hook signals to microprocessor 22. Handset 20 is also provided with a power supply 50 such as a battery, and can also include channel selection circuits for selecting which channels are to be used in communication with base 10.

The operation of a cordless telephone typically requires that a digital security code be sent from the portable handset to the base unit in order for the base unit to go "off hook" and seize and connect to a telephone line of the telephone network.

The base unit 10 has circuitry 27 to measure the RF level of the carrier received from handset 20. This circuitry can be set so that it generates a digital output signal at 30 that represents if the carrier is above or below a predetermined RF level. This preset RF level is the level at which the carrier from the handset would be at or about its maximum operational range. Microprocessor 22 is designed so that it will periodically test the carrier level for such a determination. If input 30 shows that the RF carrier signal from the handset is above this preset level, then the microprocessor 22 will not process the input. If the signal level indicated at input 30 shows that the RF signal is below the preset level, then microprocessor 22 will test the input level for a predetermined period of time, which in the exemplary embodiment is about seven seconds. If after the test period, the RF level continues to indicate that it is below the preset level, microprocessor 22 will issue a warning tone via transceiver 16 to portable handset 20.

For normal communications the audio signal transmissions between base 10 and handset 20 are relatively narrow band FM transmissions having about a 20 percent deviation. The warning tone, can be a low frequency or a high frequency tone, which in the exemplary embodiment is about 500 Hz–600 Hz with a 500 millisecond duration that is modulated directly on the base unit's RF transmitted carrier with this FM modulation deviation being substantially higher than the normal communications FM frequency deviation so that the warning tone will be received as a louder audio tone and heard by the user even if command communications between handset 20 and base 10 is not operational due to the handset being out-of-range. In the exemplary embodiment, the user upon hearing the warning tone, is informed of an out-of-range condition and is presumed to have previous knowledge that he/she must go back into range if the telephone conversation is to continue. The base will continue to measure the RF level of the carrier and if it stays below the preset level, base 10 via microprocessor 22 will issue warning tones to the handset 20 for a test period of a predetermined number of times. In the exemplary embodiment, after four test periods, the base will go "on" hook (hang up) and release the telephone line if the handset remains out of operational range.

Figure 2:
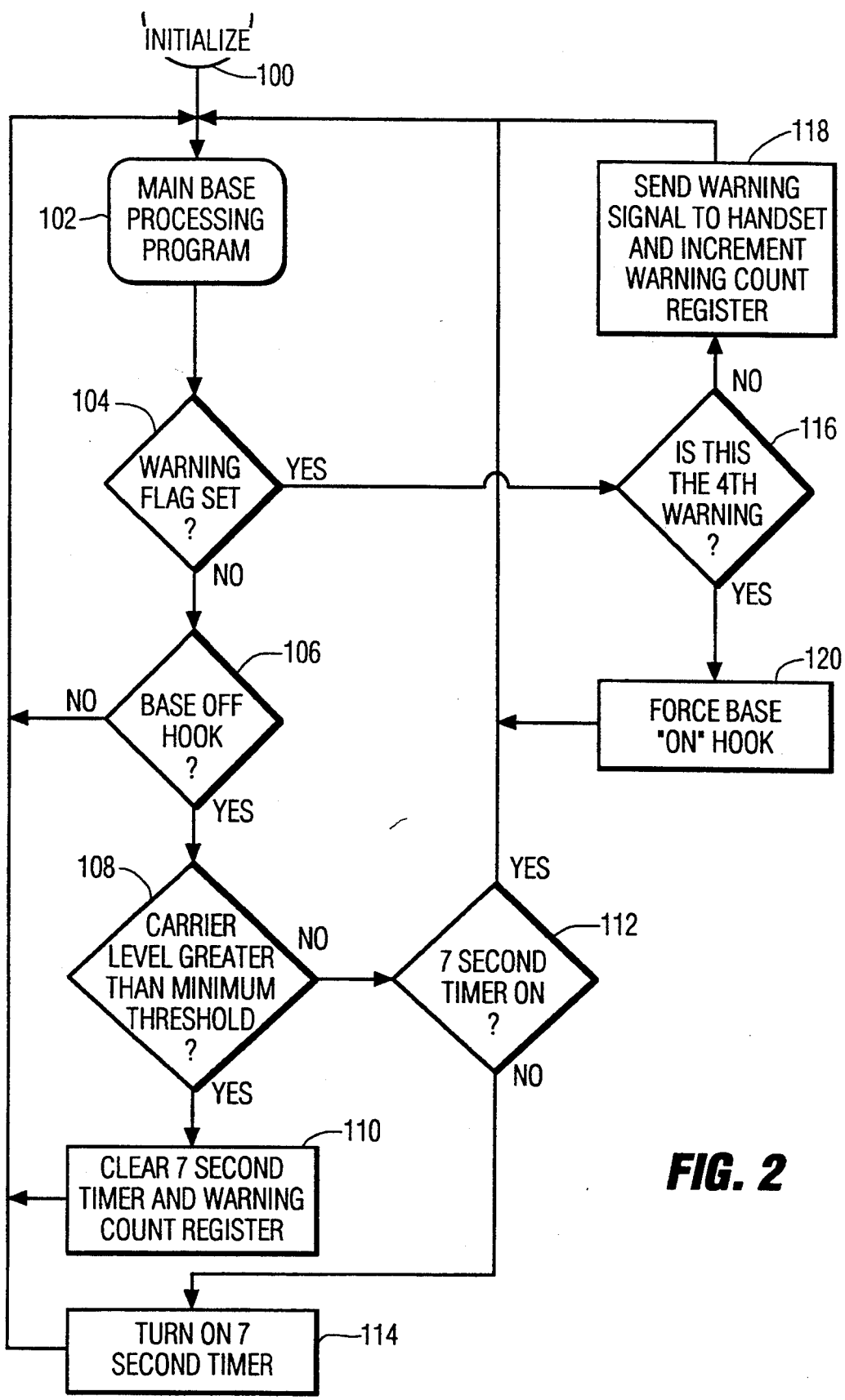
FIG. 2 is a flowchart of the main base program for the out-of-range warning system according to aspects of the present invention.
Figure 3:
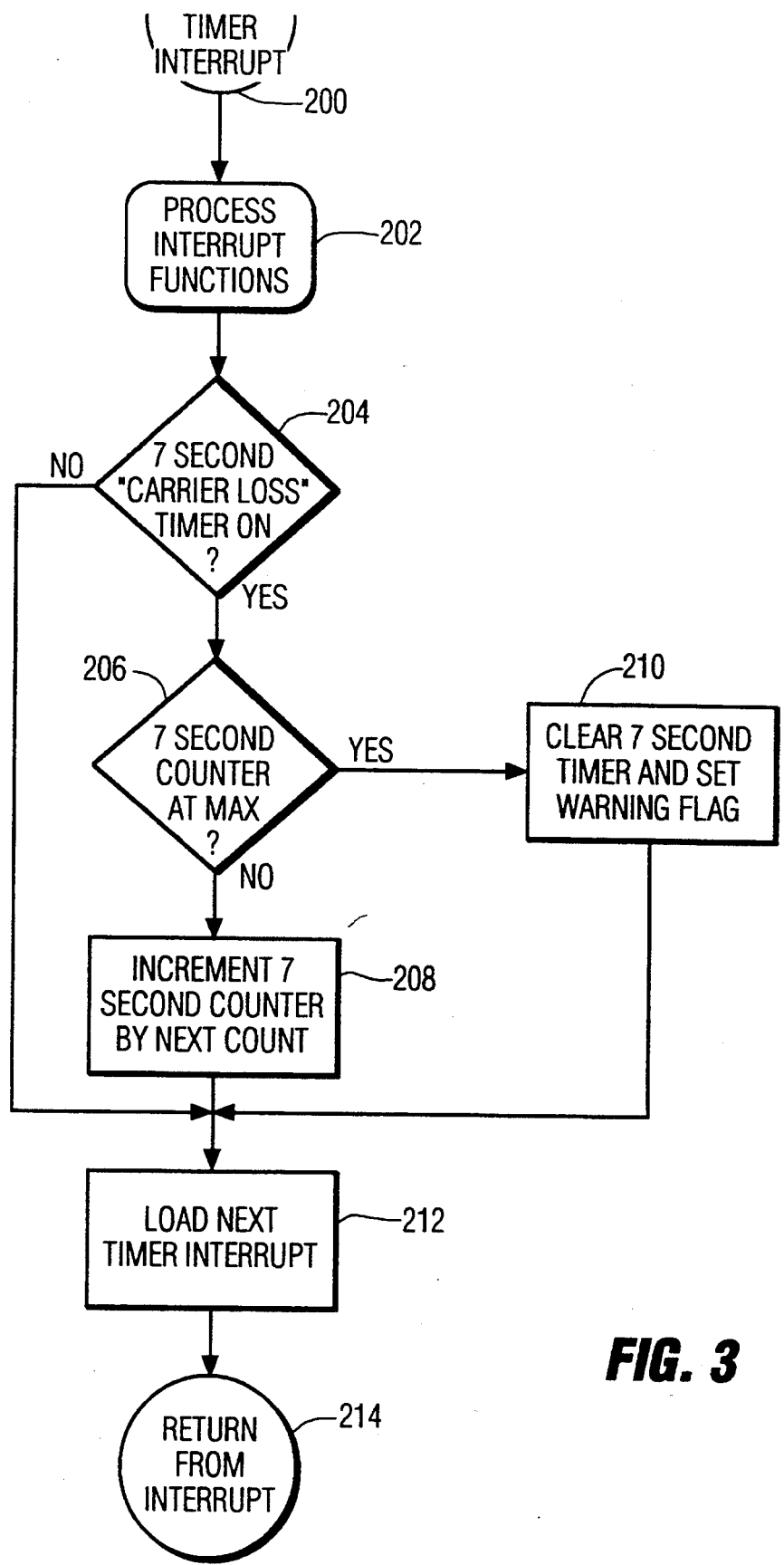
FIG. 3 is a flowchart of an interrupt service routine used by the main base program of FIG. 2.

Referring now to FIG. 2 there is shown a flow chart of the warning system according to aspects of the present invention. The system is initialized at 100. The timer processing program discussed below in connection with FIG. 3 is entered at 102. A decision as to whether the warning flag has been set is made at 104. If the warning flag has not been set, it is determined at 106 whether or not the base unit is "off" the hook. If the base is "off" hook then it is determined at 108 whether or not the carrier level is greater than the minimum threshold. If the signal is greater than the threshold level, then the seven second timer and warning count register are cleared at 110. If the carrier level is less than the minimum threshold level, then it is determined at 112 whether or not the seven second timer is "on" and if it is not "on" then it is turned "on" at 114 at which case the program goes back to 102. If the warning flag at 104 has been set, then it is determined at 116 whether or not the present warning is the fourth warning. If the present warning is not the fourth warning, then the warning signal should be sent to the handset and the warning count register is be incremented at 118. If it is the fourth warning, then the telephone unit is brought "on" hook or hung up at 120.

FIG. 3 shows a flowchart of an interrupt service routine used in cooperation with the main base program shown in FIG. 2. There is a process interrupt function at 202. At 204 it is further determined whether or not the seven second carrier timer is "on". If the timer is "on" then it is determined at 206 whether or not the seven second time is at maximum count and if it is not at maximum count it is incremented by the next count at 208. If the seven second timer is at maximum count, then it is cleared and a warning flag is set at 210. In either case, the timer load goes to the next timer interrupt at 212 and the return from the interrupt at 214.

Thus, in the exemplary embodiment, the warning signal is initiated four times at seven second intervals to give a 28 second delay once there is a determination that there is an out-of-range warning operation before the telephone unit is disconnected from the line. In this manner, inadvertent disconnects are avoided which would possibly cause great inconvenience to the user.

What is claimed is:

1. A cordless telephone unit having a handset unit and a base unit, the base unit being connectable to a telephone network and having actuatable means for seizing and releasing a telephone line of said telephone network, the handset unit having means for providing dialing and data signals to said telephone network, comprising:

duplex RF communications means between the handset and the base unit, said communications means including a base transmitter means and a base receiver means disposed in the base unit and a handset transmitter means and a handset receiver means disposed in the handset, said duplex RF communications including a carrier signal which is FM modulated with a first percentage of deviation, signal strength determination means disposed in the base unit for determining the strength of the signal received by the base receiver means from the handset transmitter means, range determination means disposed in the base unit for determining from the signal strength determination means whether the handset is at an out-of-range distance from the base unit, warning means disposed in the base unit for transmitting a plurality of warning signals from the base unit to the handset when it is determined by the range determination means that the handset is at an out-of-range distance from the base unit, said warning signals FM modulating the carrier signal at a second percentage of deviation which is greater than the first percentage of deviation in order to provide, a warning signal at the handset at an out-of-range distance, and means disposed in the base unit for putting the cordless telephone unit in an "on" hook status after a predetermined number of warning signals are transmitted.

2. A cordless telephone unit having a handset unit and a base unit, the base unit being connectable to a telephone network and having actuatable means for seizing and releasing a telephone line of said telephone network, the handset unit having means for providing dialing and data signals to said telephone network, comprising:

duplex RF communications means between the handset and the base unit, said communications means including a base transmitter means and a base receiver means disposed in the base unit and a handset transmitter means and a handset receiver means disposed in the handset, said duplex RF communications including a carrier signal which is FM modulated with a first percentage of deviation, signal strength determination means disposed in the base unit for determining the strength of the signal received by the base receiver means from the handset transmitter means, range determination means disposed in the base unit for determining from the signal strength determination means whether the handset is beyond a predetermined range from the base unit, warning means disposed in the base unit for transmitting a plurality of warning signals from the base unit to the handset when it is determined by the range determination means that the handset is beyond the predetermined range, the warning means comprising a tone of predetermined duration that is modulated directly on the RF carrier overriding the normally transmitted signal, said warning tones FM modulating the carrier signal at a second percentage of deviation which is greater than the first percentage of deviation in order to provide a warning tone at the handset at a distance further than the predetermined range, and means disposed in the base unit for putting the cordless telephone unit in an "on" hook status after a predetermined number of warning signals are transmitted.

3. A cordless telephone unit having a handset unit and a base unit the base unit being connectable to a telephone network and having actuatable means for seizing and releasing a telephone line of said telephone network, the handset unit having means for providing dialing and data signals to said telephone network, comprising:

duplex RF communications means between the handset and the base unit, said communications means including a base transmitter means and a base receiver means disposed in the base unit and a handset transmitter means and a handset receiver means disposed in the handset, said duplex RF communications including a carrier signal which is FM modulated with a first percentage of deviation, signal strength determination means disposed in the base unit for determining the strength of the signal received by the base receiver means from the handset transmitter means, range determination means disposed in the base unit for determining from the signal strength determination means whether the handset is at an out-of-range distance from the base unit, warning means disposed in the base unit for transmitting a plurality of warning signals from the base unit to the handset when it is determined by the range determination means that the handset is at an out-of-range distance from the base unit, the warning means comprising means for transmitting the warning signals so that they are receivable by the handset even if the handset is at an out-of-range distance from the base unit, the warning signals comprising a tone of predetermined duration that is modulated directly on the RF carrier overriding the normally transmitted signal so that it can be heard at an out-of-range distance, said warning tone FM modulating the carrier signal at a second percentage of deviation which is greater than the first percentage of deviation in order to provide a warning tone at the handset at an out-of-range distance, and means disposed in the base unit for putting the cordless telephone unit in an "on" hook status after a predetermined number of warning signals are transmitted.

* * * * *